Patented Nov. 4, 1924.

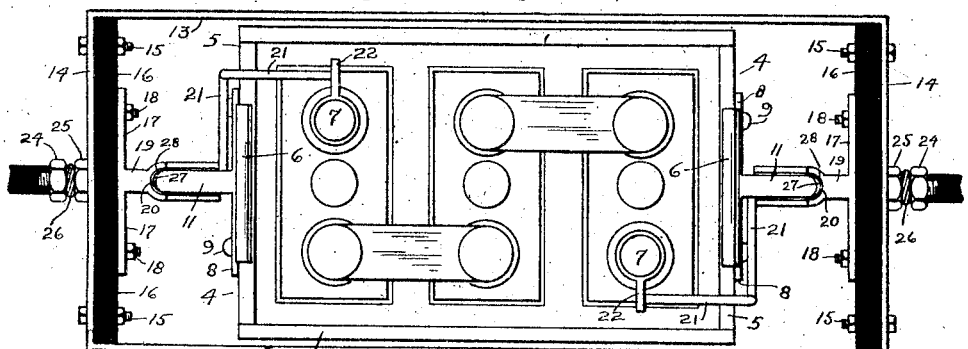
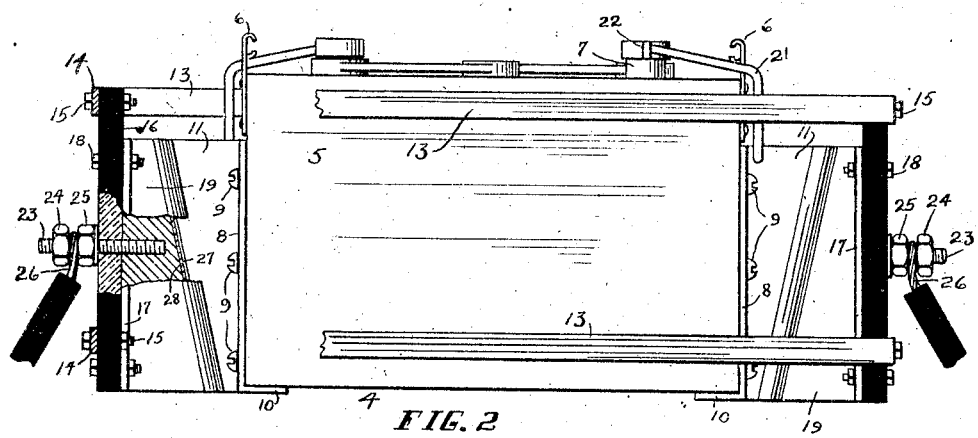
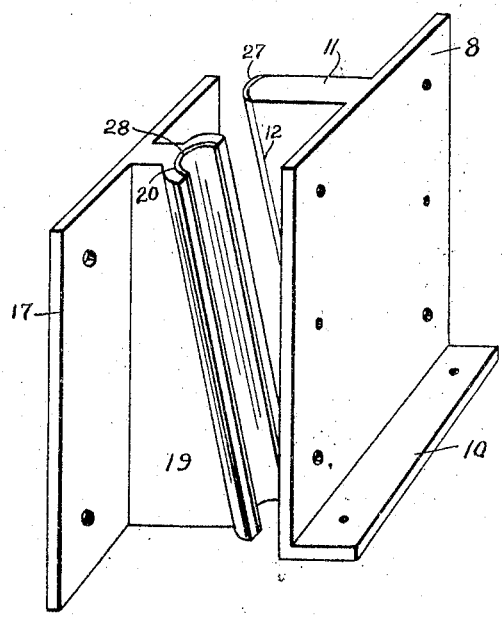

1,514,056

UNITED STATES PATENT OFFICE.

JOHN W. LEITZEN, OF MAPLETON, IOWA.

STORAGE BATTERY.

Continuation of application Serial No. 553,960, filed April 17, 1922. This application filed May 29, 1922.
Serial No. 564,664.

*To all whom it may concern:*

Be it known that I, JOHN W. LEITZEN, a citizen of the United States, and a resident of Mapleton, in the county of Monona and State of Iowa, have invented certain new and useful Improvements in Storage Batteries, of which the following is a specification.

This is a continuation of my application No. 553,960, filed April 17, 1922, allowed May 5, 1922, and abandoned by notice of abandonment dated May 26, 1922.

The invention contemplates improved means for connecting the service conductors to the terminals of a storage battery.

Another object of the invention is the production of means for connecting the service conductors with the terminals of a storage battery, which means obviates the operation of any threaded members in connecting or disconnecting the service conductors to or from the terminals.

Furthermore, the invention has for an object the production of a mechanism for connecting the service conductors of a storage battery with the terminals of a battery, and embodying certain novel features of construction and arrangements of parts whereby the service conductors are automatically connected with the storage battery terminals by placing the battery in its normal position, and automatically disconnected by the removal of the battery from its normal position; and whereby the battery, when placed in its normal position, is secure against accidental displacement.

The invention has for a further object the production of improved battery connecting and securing means consisting of suitable supports on opposite sides of the battery and a pair of oppositely tapered members at each side of the battery, one of said members of each pair being secured to the adjacent support, and its mate being secured to the battery and connected by a suitable conductor with the adjacent battery terminal and adapted to contact and coact with its mate to hold the battery removably, yet securely, against accidental displacement.

These and other objects and advantages I successfully attain in the embodiment hereinafter described, defined in the appended claims and illustrated in the accompanying drawing which forms a part of this application and in which like characters of reference indicate corresponding parts throughout the several views, of which,—

Fig. 1 is a plan of a storage battery connecting and supporting means constructed in accordance with my invention.

Fig. 2 is a side elevation thereof, parts being cut away and shown in section, and Fig. 3 is an enlarged, perspective view of one pair of the tapered connecting and securing members.

Referring, now, to the illustrations, 4 represents generally a familiar type of storage battery, including its box, 5, handles, 6, and terminal poles, 7. On opposite sides of the box, 5, I secure metal plates, 8, as by screws, 9, or otherwise, and having their lower ends formed with flanges, 10, on which the bottom of the box, 5, rests. The plates, 8, are also provided with vertical flanges, 11, disposed centrally of the side of the box and having their edges inclined or tapered, as at 12, in the direction of the bottom of the box. Suitable supporting means are provided at opposite sides of the battery as by a rectangular frame within which the battery is positioned and including upper and lower longitudinal bars, 13, and upper and lower cross bars, 14. The upper and lower bars, 14, at each side of the battery are bolted, as at 15, or otherwise suitably secured to insulation blocks, 16, to the adjacent sides of which are secured plates, 17, as by bolts, 18, or otherwise. The plates, 17, are provided with flanges, 19, having their edges inclined and provided with grooves, 20, to correspond to and receive, respectively, the flanges, 11, of the plates, 8. The flanges, 11, are permanently connected with the battery terminals as by suitable electrical conductors, 21, each having one end welded or burnt onto the flange, 11, and its opposite end firmly secured to a suitable terminal, 22, on the adjacent battery terminal post, 7.

The flanged plates, 17, are provided with suitable terminals to which the service conductors are connected. The said terminals preferably comprise bolts, 23, projecting through the block, 16, and threaded through the plate, 17, and into the flanges, 19, as shown in Fig. 2. Between nuts, 24 and 25, are secured the battery service conductors, 26. The coacting edges of the flanges, 11 and 19, are covered, preferably one with lead and the other with brass, the lead ring of a non-corrosive and soft nature provides a seat which readily conforms and adapts itself to the flange and thereby makes a perfect electrical contact. In the embodiment illustrated the edge of the flange, 11, is clad with brass, 27. while the groove, 20, is lined with lead, 28, thus insuring a perfect electrical connection between contacting members.

It will now be clear that to connect the battery with the service conductors it is only necessary to lower the battery into the position shown in Figs. 1 and 2, in which position the flanges, 11, are received in the grooves, 20, and the wedging action between the flanges, 11 and 19, produced by the weight of the battery, insures a perfect connection between the service conductors and the battery terminals and secures the battery against accidental displacement when used in a motor vehicle.

It will also be observed that the contacting members, 11 and 19, are so remote from the battery terminals that they will not be corroded by acid from the battery.

Although I have illustrated and above described but one species of the invention, I would not be understood as being limited to such specific construction, for various alterations and modifications may be made in the details of construction and arrangements of parts herein disclosed without departing from the spirit and scope of the invention as defined in the appended claims.

Having thus described my invention, what I claim as new and desire to secure by Letters Patent of the United States, is,—

1. In an electrical battery having a box and terminal poles, a securing and connecting means including supports at opposite sides of the box, and a pair of tapered members at each side of the box. one of said members of each pair being secured to the box and connected with the adjacent pole of the battery, and the other member of the pair being fixed to the adjacent support, said tapered members being adapted to coact in a wedging action to support the battery and provide electrical current conductivity between the battery pole and the associated member secured to the support.

2. An electrical battery including tapering terminals on its opposite sides, supporting means at opposite sides of the battery, and tapered electrical conducting elements fixed to said means and adapted to wedgingly coact, respectively, with said tapering terminals to removably support the battery and detachably electrically interconnect the terminals and said elements.

3. The combination with a battery and suitable supports at opposite sides thereof, of upright tapering terminals secured to and projecting from opposite sides of the battery, and tapering electrical conducting elements fixed to the supports, and adpated to wedgingly coact, respectively, with said terminals to removably support the battery and detachably electrically interconnect the terminals with said elements.

4. The combination with a battery and suitable supports at opposite sides thereof, of vertical plates projecting from opposite sides of the battery, electrically connected, respectively, with the battery terminals, and having tapered free edges, and vertical plates secured to the supports and having their free edges tapered to wedgingly coact with the tapered edges of said first plates to removably support the battery and detachably electrically interconnect said first and second plates.

5. The combination with a battery and suitable supports at opposite sides thereof, of a pair of vertical plates projecting from opposite sides of the battery, electrically connected, respectively, with the battery terminals and having tapered free edges, and a pair of vertical plates secured, respectively, to the supports and having their free edges tapered to wedgingly coact with the tapered edges of said first plates to removably support the battery and detachably electrically interconnect said first and second plates, the free edges of said second pair of plates being grooved to receive the edges of the said first pair.

6. The combination with an electrical battery including its box and terminals, of supporting members at opposite sides of the battery, electrical conducting plates secured to said members and provided on their adjacent sides with vertical flanges having inclined edges, and electrical conducting plates secured to opposite sides of the battery and provided with vertical flanges having inclined edges to engage and wedgingly coact, respectively, with the said first flanges to removably support the battery and detachably electrically interconnect said first and second flanges, said second flanges being electrically connected with the battery terminals.

7. An electrical connecting and supporting means for storage batteries embodying two pairs of tapering electricity conducting elements adapted to be positioned at opposite sides of a battery, one element of each pair being adapted to be secured to the battery and connected electrically with a terminal of the battery, and the other adapted to be secured to a suitable support and wedgingly coact and electrically contact with its mate to rigidly support the battery removably against lateral movement.

8. An electric battery including supporting members, paired elements at opposite sides of the battery, one element of each pair being a terminal of the battery and its mate being secured to one of said members, said elements of each pair having oppositely-inclined wedgingly coacting surfaces to removably and rigidly support the battery with respect to said members and establish electrical conductivity between the elements of each pair.

9. The combination with a battery and supports at opposite sides thereof, of inclined tongued and grooved elements, one of said elements being secured to the battery and the other to the adjacent support, whereby the elements wedgingly cooperate to removably support and hold the battery rigidly with respect to the supports.

10. A terminal connecting means for a battery including separate elements adapted to be secured respectively to the battery and a suitable support and wedgingly and rigidly co-act through the weight of the battery to prevent relative lateral movement between themselves and make electrical connection with the battery.

11. A terminal connection and support for a battery having an adjacent support, including separate elements adapted to be secured respectively to the battery and support and wedgingly co-act through the weight of the battery to make electrical connection with and rigidly hold the battery against lateral movement with respect to the support.

12. Terminal connecting means for a battery including separate contacting elements adapted to be secured, respectively, to the battery and a suitable support to coact through the weight of the battery to make electrical connection with the battery, the contacting surface of at least one of said elements being of lead material.

13. The combination with a battery and supports at opposite sides thereof, of inclined tongued and grooved elements, one of said elements being secured to the battery and the other to the adjacent support, whereby the elements wedgingly co-operate to removably support and hold the battery rigidly with respect to the supports, said grooved elements being lined with lead.

In testimony whereof, I have hereunto set my hand this 26" day of May, 1922.

JOHN W. LEITZEN.